United States Patent Office 2,975,104
Patented Mar. 14, 1961

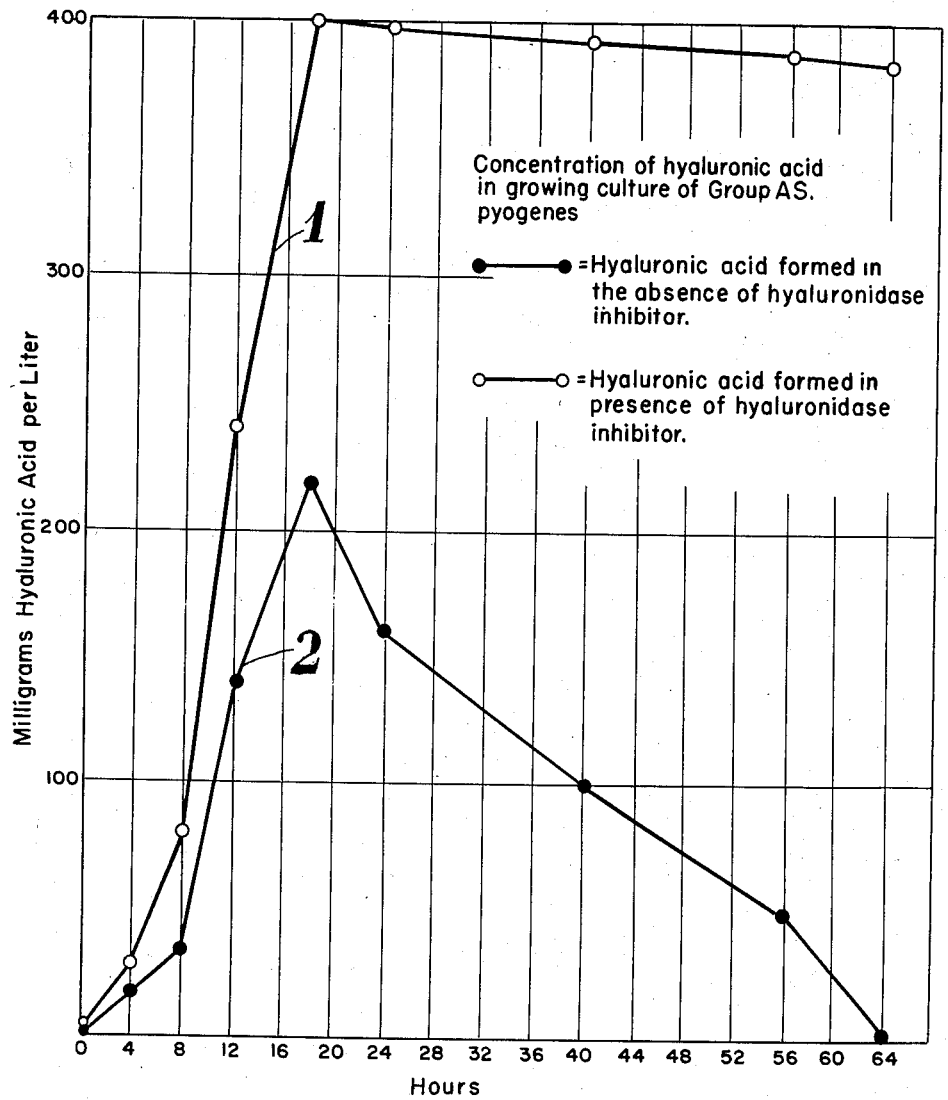

2,975,104
MEDIUM AND METHOD FOR PRODUCING AND ISOLATING HYALURONIC ACID

George H. Warren, Havertown, Pa., assignor to American Home Products Corporation, New York, N.Y., a corporation of Delaware Filed May 21, 1959, Ser. No. 814,753

5 Claims. (Cl. 195—28)

This invention relates to an improved and novel medium and method for producing and isolating streptococcal hyaluronic acid.

Hyaluronic acid is a mucopolysaccharide of high molecular weight forming an essential component of ground substance or cement substance of animal tissues. Its aqueous solutions have a high viscosity. On complete hydrolysis it gives equimolecular proportions of glucosamine, glucuronic acid and acetic acid. It is elaborated in the life processes of certain microorganisms, and cultures of Streptococcus pyogenes Groups A and C have been found to be advantageous sources. Pseudomonas aeruginosa has also been shown to produce hyaluronic acid. Other microorganisms produce hyaluronidase-sensitive polysaccharide material which is, or is similar to, hyaluronic acid.

In various stages of polymerization hyaluronic acid has valuable properties for physiological research and for therapeutic use.

Since the first isolation of hyaluronic acid from cultures of strains of Groups A and C streptococci numerous methods for its extraction and purification from bacterial cultures have been reported. Previous methods have depended mainly on the growth of the organism in complex organic culture media many of which contain hyaluronidase-sensitive polysaccharide material which may be or may not be or contain hyaluronic acid. Purification techniques have been laborious, complicated and feasible only for the isolation of relatively small quantities of material since the mature culture contains such polysaccharide material in addition to the hyaluronic acid produced by bacterial growth.

Furthermore previous methods have proved exceedingly critical as to duration of the incubation; unless the optimum time under the particular conditions prevailing is chosen for terminating the incubation, hyaluronic acid yield will be lost. This may be due either to premature termination with less than the maximum production of hyaluronic acid, or to too long continuation with resulting degradation of hyaluronic acid already formed, apparently due to simultaneous production by the bacteria of hyaluronidase with the hyaluronic acid. The determination of the optimum incubation time is thus obviously an awkward and uncertain matter.

Accordingly it is an object of this invention to provide a novel medium and method for isolating and purifying hyaluronic acid which results in improved yields and is readily reproducible.

It is a further object to provide such a method which results in a product of greater purity.

It is an additional object to provide a novel and simplified culture medium for carrying out this method.

Other objects and advantages of my invention will be apparent to those skilled in the art from the following disclosure.

According to my invention I grow a culture of a Group A or C Streptococcus in a medium consisting essentially of casein hydrolyzate, inorganic salts, vitamins, glucose and water which is free of hyaluronidase-sensitive polysaccharide material. Preferably I add to this medium a small amount of a sulfated mucopolysaccharide which is an inhibitor of hyaluronidase activity and is non-toxic for the Streptococcus. Examples of such inhibitors are alginic acid sulfate and heparin.

These media not only produce adequate growth of the bacteria in question, but have the double advantage of (a) avoiding the introduction of extraneous hyaluronidase-sensitive polysaccharide material and (b), when a hyaluronidase inhibitor is added, of eliminating the criticality of the termination time.

Because the medium is free of extraneous hyaluronidase-sensitive polysaccharide material and consists for the most part of chemically well defined individuals, the product as recovered is in a partially purified state without extensive purification treatment.

With the preferred medium, containing a hyaluronidase inhibitor, the duration of the incubation is no longer critical and the incubation may be continued for many hours after maximum hyaluronic acid production without substantial loss of yield due to degradation. This greatly simplifies the practical carrying out of the operation and facilitates obtaining reproducible results.

My media, in addition to the casein hydrolyzate, contain sodium, potassium, magnesium, phosphate and sulfate ions, calcium-d-pantothenate, pyridoxine, riboflavin and glucose, preferably together with a small amount of the sulfated mucopolysaccharide, and are adjusted to a near neutral reaction, e.g. pH 7.6–7.8.

I recover hyaluronic acid from the inactivated and filtered crude broth by precipitation with acetone, solution in acetic acid, reprecipitation several times in ethanol, solution of the precipitate in water, dialysis of the aqueous solution against water, and freeze drying.

The resulting product is free of glycogen and sulfur, has a nitrogen content of approximately 3–4 percent (percent-average of 35 preparations, 3.4 percent), and gives a negative biuret test. Refined chemical tests for protein indicate a protein content of not over about 3 percent.

The following example describes a preferred embodiment of my invention, but is intended to be illustrative only and not to limit its scope, which is defined in the appended claims.

*Example 1*

Group A type 9 (T9/63/3) Streptococcus pyogenes, obtained from the Hospital of the Rockefeller Institute was maintained in blood agar containing 5 percent defibrinated sheep's blood. Actively growing seed cultures were prepared by transfer of growth from 24 hour stock slants to 10 ml. of the preferred culture medium (described below) before transfer to 500 ml. of simliar broth which was then incubated for 18 hours at 37° C.

The medium used consisted of casein hydrolyzate (enzymatic) 50 g.; $Na_2HPO_4 \cdot 12H_2O$, 11.2 g.; $KH_2PO_4$, 0.96 g.; $MgSO_4$, 0.04 g.; Ca-d-pantothenate, 1.0 mg.; pyridoxine HCl, 1.0 mg.; riboflavin, 0.1 mg.; distilled water, 1 liter. The medium was adjusted to pH 7.6–7.8 with 5 N NaOH and sterilized by autoclaving at 120° C. for 20 minutes. After sterilization, the medium was supplemented with glucose (sterilized by filtration through a Seitz filter) to a final concentration of 10 mg./ml., and 0.1 mg./ml. alginic acid sulfate (Snyder, U.S. Patent 2,508,433) was added. Nine-liter Pyrex carboys containing 5 liters of medium were employed. Inoculation was made with 500 ml. of seeding culture per 5 liters medium.

The inoculated medium was incubated in 9-liter carboys for 16–18 hours at 37° C. Activity was then terminated by heating the contents of the 9-liter carboys in a boiling-water bath for 1 hour, quickly cooling and adding formalin with mixing to a final concentration of 2 percent. The carboys were stoppered with rubber stoppers and stored at room temperature. Crude hyaluronic acid broths treated in this manner may be stored at room temperature for at least 6 months with no loss in yield of final product.

The crude broth, clarified by filtration through "Hyflo Super-Cel" (Johns Manville) was treated with three volumes of cold acetone. A highly viscous brown liquid phase immediately separated and the two-phase liquid was stored overnight in the cold room (5° C.). The supernatant fluid was decanted and the brown liquid phase was diluted with an equal volume of distilled water. To 1 liter of viscous brown liquid phase extract, 250 ml. of glacial acetic acid and 125 grams of potassium acetate were added. The mixture was stirred for 5 minutes and poured into 1,250 ml. of cold 95% ethyl alcohol producing a white flocculent precipitate. After 30 minutes in an ice bath, the precipitate was collected by filtration with suction through "Hyflo Super-Cel" and dissolved in distilled water. A second and third reprecitation was performed in this manner. The final precipitate was washed with absolute ethyl alcohol, dissolved in distilled water, dialyzed against frequent changes of distilled water for 48 hours at 4° C. and then freeze-dried. The yield of potassium hyaluronate from one series of runs averaged 230 mg. per liter. Yields may run as high as 400 mg. or more per liter.

On analysis the thus partially purified product gave no positive protein test with any protein precipitant nor with the biuret reagent; more refined chemical procedures indicated a protein content of not over about 3 percent. Tests for glycogen and sulfur were negative. Nitrogen was determined by the micro-Kjeldahl method on 35 preparations and values varied between 2.9 and 3.9 percent with an average of 3.4 percent. The glucosamine content of the product was 32.3 percent.

*Example 2*

The process was carried out as described above but without the addition of alginic acid sulfate as a hyaluronidase inhibitor; the yield was substantially the same, averaging 228 mg. per liter. On turbidimetric assay, however, the product gave a much lower turbidity value than that produced in the presence of alginic acid sulfate, indicating a lower degree of polymerization. The excellent yields in the absence of alginic acid sulfate showed that the time of incubation was optimum.

If the incubation period was extended many hours beyond the 16–18 hours of Example 1, the yield of hyaluronic acid was practically undiminished due to degradation; whereas if the incubation of Example 2 in the absence of alginic acid sulfate was continued, the yield dropped to zero in 64 hours.

The two curves in the accompanying drawing illustrate a typical effect of continuing the incubation of my improved culture without hyaluronidase inhibitor and (in its preferred form) with added hyaluronidase inhibitor. The absciasse represent hours of incubation at 37° C., as described above, and the ordinates represent hyaluronic acid recoverable in terms of milligrams per liter of broth. Curve 1 represents the yield of one run in the presence of alginic acid sulfate, a maximum of 400 mg./liter being reached in 18 hours. Curve 2 represents the yield of a run in the absence of alginic acid sulfate, a maximum of 230 mg./liter being reached in the same time. In the former case the yield lost in continuing the incubation for 64 hours was negligible, while in the latter the yield fell from the maximum at 18 hours to zero at 64 hours.

I claim:
1. The method of producing hyaluronic acid from a culture of hyaluronic-acid-producing streptococci which comprises growing the streptococci in an aqueous medium free of hyaluronidase-sensitive polysaccharide material and containing only casein hydrolyzate, chemically well defined nutrients and a sulfated mucopolysaccharide which is non-toxic to the streptococci and is an inhibitor of hyaluronidase activity, said chemically well defined nutrients consisting of sodium, potassium, magnesium, phosphate and sulfate ions, calcium-d-pantothenate, pyridoxine, riboflavin and glucose, continuing the incubation at least to a point of maximum hyaluronic acid production, thereafter terminating the incubation, and recovering hyaluronic acid from the broth.

2. The method according to claim 1 in which the Streptococcus is *Streptococcus pyogenes*.

3. The method according to claim 1 in which the sulfated mucopolysaccharide is alginic acid sulfate.

4. The method of producing hyaluronic acid which comprises incubating at 37° C. a culture of *Streptococcus pyogenes* in a medium free of hyaluronidase-sensitive polysaccharide material and consisting of casein hydrolyzate, disodium phosphate, monopotassium phosphate, magnesium sulfate, calcium-d-pantothenate, pyridoxine, riboflavin and glucose in nutrient concentrations; alginic acid sulfate in an approximate concenration of 0.1 mg./ml., and water; continuing the incubation for at least 18 hours; thereafter thermally inactivating the culture; filtering the crude inactivated broth; and recovering hyaluronic acid from the filtrate.

5. A culture medium for the production of hyaluronic acid by the growth of streptococci, said medium having a near-neutral pH value being free of hyaluronidase-sensitive polysaccharide material and consisting of: casein hydrolyzate, inorganic salts yielding sodium, potassium, magnesium, phosphate and sulfate ions, calcium-d-pantothenate, pyridoxine, riboflavin and glucose in nutrient concentrations; and an effective concentration of alginic acid sulfate for inhibiting hyaluronidase activity.

References Cited in the file of this patent

Biochemical Journal, vol. 42, pages 266 to 274, 1948, Cambridge University Press, London.

Journal of Biological Chemistry, vol. 203, pages 213 to 225 (page 213 relied upon) 1953, Waverly Press, Baltimore, Maryland.

Proceedings of The Society for Experimental Biology and Medicine, vol. 87, pages 50 to 54, 1954, T. J. Griffiths Sons, Utica, N.Y.